(12) United States Patent
Coggins

(10) Patent No.: US 7,793,526 B1
(45) Date of Patent: Sep. 14, 2010

(54) VEHICLE ANTI-THEFT DEVICE

(76) Inventor: Timothy L. Coggins, 2847 Pickard Rd., Sanford, NC (US) 27330

( * ) Notice: Subject to any disclaimer, the term of this patent is extended or adjusted under 35 U.S.C. 154(b) by 0 days.

(21) Appl. No.: 12/476,663

(22) Filed: Jun. 2, 2009

(51) Int. Cl.
*F16H 57/00* (2006.01)
(52) U.S. Cl. ............... 70/203; 70/14; 70/56; 70/202
(58) Field of Classification Search ............... 70/14, 70/54–56, 199–203
See application file for complete search history.

(56) References Cited

U.S. PATENT DOCUMENTS

| | | | | |
|---|---|---|---|---|
| 1,124,882 | A * | 1/1915 | Flickinger | 70/203 |
| 1,291,617 | A * | 1/1919 | O'Leary | 70/202 |
| 1,340,051 | A * | 5/1920 | Jackson | 70/202 |
| 1,343,459 | A * | 6/1920 | Lacy | 70/199 |
| 1,371,886 | A * | 3/1921 | Gage | 70/203 |
| 1,388,149 | A * | 8/1921 | Friedrich | 70/203 |
| 1,427,285 | A * | 8/1922 | Goehner | 70/203 |
| 1,444,379 | A * | 2/1923 | Jones | 70/202 |
| 1,527,992 | A * | 3/1925 | Norton | 70/200 |
| 1,558,628 | A * | 10/1925 | Purcell | 200/43.14 |
| 2,169,860 | A * | 8/1939 | Von Hoorn | 70/203 |
| 4,013,315 | A | 3/1977 | West | 296/83 |
| 4,332,415 | A | 6/1982 | Williams | 295/213 |
| 4,333,326 | A * | 6/1982 | Winters | 70/203 |
| 4,493,198 | A * | 1/1985 | Brown | 70/203 |
| D326,831 | S | 6/1992 | Lanius et al. | D12/16 |
| 5,359,868 | A * | 11/1994 | Villani | 70/203 |
| 5,426,959 | A * | 6/1995 | Kies | 70/56 |
| 5,482,136 | A * | 1/1996 | Sorkin | 180/287 |
| 5,540,065 | A * | 7/1996 | Wyers | 70/26 |
| 5,845,521 | A * | 12/1998 | Najera | 70/56 |
| 6,085,559 | A * | 7/2000 | Jarrett | 70/202 |
| 6,357,266 | B1 * | 3/2002 | Van Buren | 70/56 |
| 6,427,496 | B1 * | 8/2002 | Hurst | 70/14 |
| 6,519,982 | B1 * | 2/2003 | Brammall et al. | 70/56 |
| 6,732,556 | B1 * | 5/2004 | Russell | 70/201 |
| 7,204,109 | B1 * | 4/2007 | De Lucia | 70/202 |

\* cited by examiner

*Primary Examiner*—Suzanne D Barrett

(57) ABSTRACT

An anti-theft device comprises a housing for enclosing and locking in place the accelerator pedal of vehicles such as a golf cart. The housing is formed from rigid steel or other suitable materials and includes an open top and a bottom having a T-shaped opening therein to allow the accelerator pedal to be inserted therethrough. An L-shaped retaining rod is placed through an opening in one side of the housing, slid behind the accelerator pedal and positioned through the opening in the opposing side of the housing. A padlock or similar device is placed through an aperture in the retaining rod to secure the housing to the golf cart and prevent depression of the accelerator pedal. The anti-theft device thus prevents the accelerator pedal from being depressed and the vehicle being moved or stolen.

9 Claims, 5 Drawing Sheets

VEHICLE ANTI-THEFT DEVICE

FIELD OF THE INVENTION

The invention herein pertains to vehicles which utilize an accelerator pedal and particularly pertains to golf carts and other vehicles which are battery powered.

DESCRIPTION OF THE PRIOR ART AND OBJECTIVES OF THE INVENTION

Golf carts have become increasingly popular in recent years with most golf courses employing a fleet of golf carts for their patrons. Such carts are generally battery powered and specific maintenance schedules allow the carts to be recharged during off-hours. Vandalism and destruction has increased over the years and golf course owners and managers must be increasingly vigilant to protect their property. Oftentimes juveniles will enter golf and country clubs and take electric golf carts for joyrides, sometimes damaging the carts and the golf course. Thieves often attempt to breach the security of stored golf carts and steal the golf carts so they can be dismantled, modified or sold to unsuspecting cart purchasers.

While fences, gates, key switches and other security devices are usually employed, there has remained a need for preventing golf carts from being "hot wired" or removed from a security area by unauthorized persons.

Thus, in accordance with the problems and disadvantages of current golf cart protection and storage, the present invention was conceived and one of its objectives is to provide an anti-theft device for a golf cart which will prevent the golf cart from being operated by unauthorized persons.

It is another objective of the present invention to provide an anti-theft device which can be inexpensively purchased and installed by relatively unskilled workers.

It is still another objective of the present invention to provide an anti-theft device which encloses and prevents depression of the vehicle accelerator pedal.

It is yet another objective of the present invention to provide a vehicle anti-theft device which includes a rigid housing and an L-shaped retaining rod fitted thereto.

It is a further objective of the present invention to provide an anti-theft device which can be placed over the accelerator pedal of a vehicle such as a golf cart and secured in place with a padlock.

It is still a further objective of the present invention to provide an anti-theft device which can be quickly, easily removed from the vehicle as needed.

It is yet a further objective of the present invention to provide an anti-theft device which will not interfere with the charging of the vehicle battery during off-times.

Various other objectives and advantages of the present invention will become apparent to those skilled in the art as a more detailed description is set forth below.

SUMMARY OF THE INVENTION

The aforesaid and other objectives are realized by providing an anti-theft device for golf carts or other vehicles. The device includes a rigid housing with a front, opposing planar sides, a rear, an open top and a bottom defining an inverted T-shape opening for easily installing around the accelerator pedal. A solid cylindrical brace joins the opposing planar sides along the open front for structural integrity.

A rigid cylindrical retaining rod having an L-shape is also utilized. The opposing sides of the housing each include an aperture which allows the L-shaped steel retaining rod to be slid therethrough and fitted behind the enclosed accelerator pedal. The retaining rod has an aperture in its straight, distal end whereby a padlock or other locking means keeps the retaining rod in place in the housing. The proximal end of the retaining rod has an L-shape to maintain it in the housing.

In use the anti-theft device is positioned over the accelerator pedal against the floor and cart wall. The retaining rod is then slid through one of the side apertures, behind the accelerator pedal and through the opposing side aperture of the housing whereby a padlock is then positioned through the retaining rod aperture. The padlock is closed and the anti-theft device is now secured to the golf cart and prevents depression of the accelerator pedal. The anti-theft device can not be removed from the cart when locked in place due to the shape and fit of the housing in the cart and the pressure of the retaining rod exerted against the accelerator pedal. The T-shaped bottom opening barely clears the bottom of the accelerator pedal, keeping the housing from being lifted or removed while the retaining rod prevents depression of the accelerator pedal. By reversing the installation steps, the anti-theft device can be quickly removed and the accelerator pedal of the cart can again be depressed to operate the cart.

DETAILED DESCRIPTION OF THE PREFERRED EMBODIMENT AND OPERATION OF THE INVENTION

Figure 1:
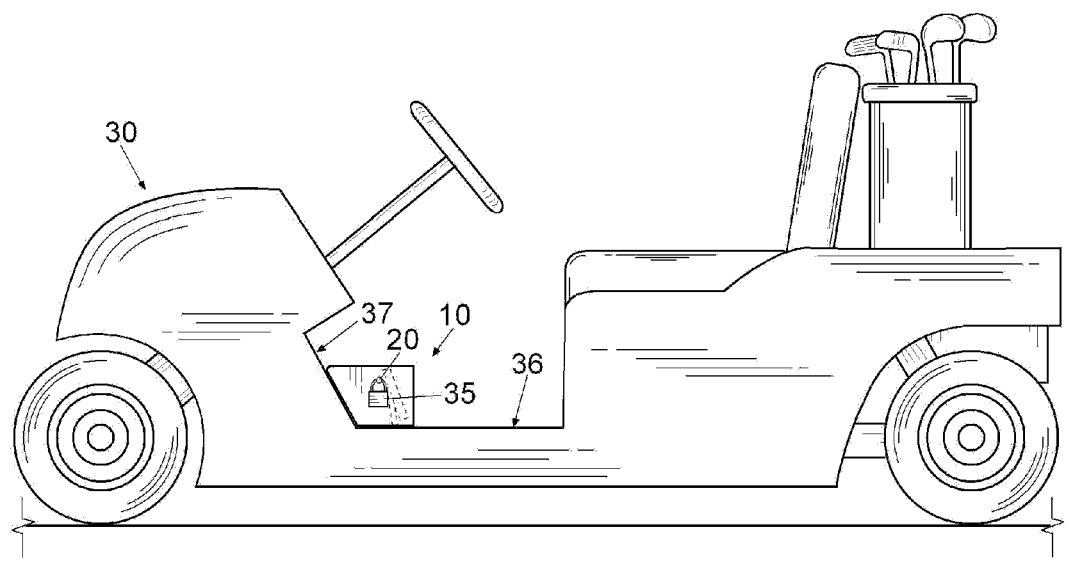
FIG. 1 illustrates a right side elevational view of the anti-theft device as installed on a conventional golf cart.
Figure 2:
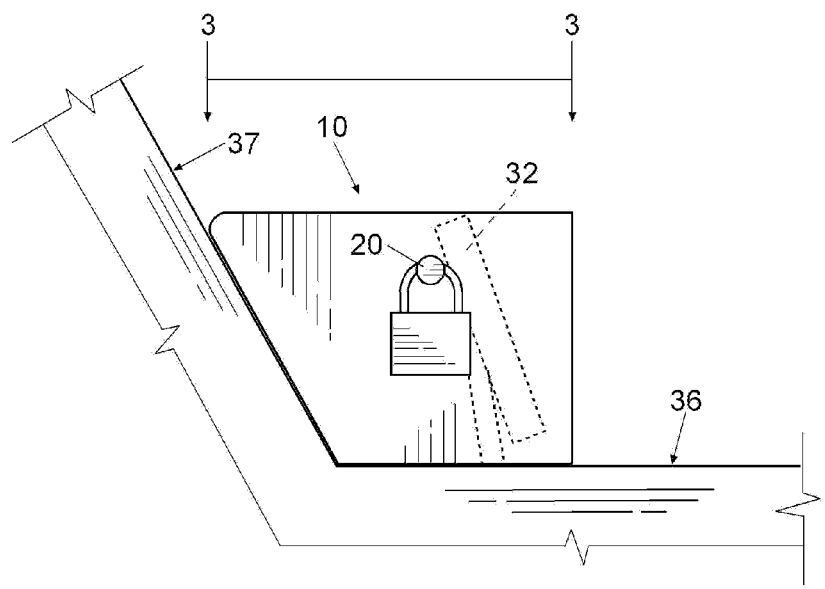
FIG. 2 depicts an enlarged right side elevational view of the anti-theft device as seen in FIG. 1.
Figure 3:
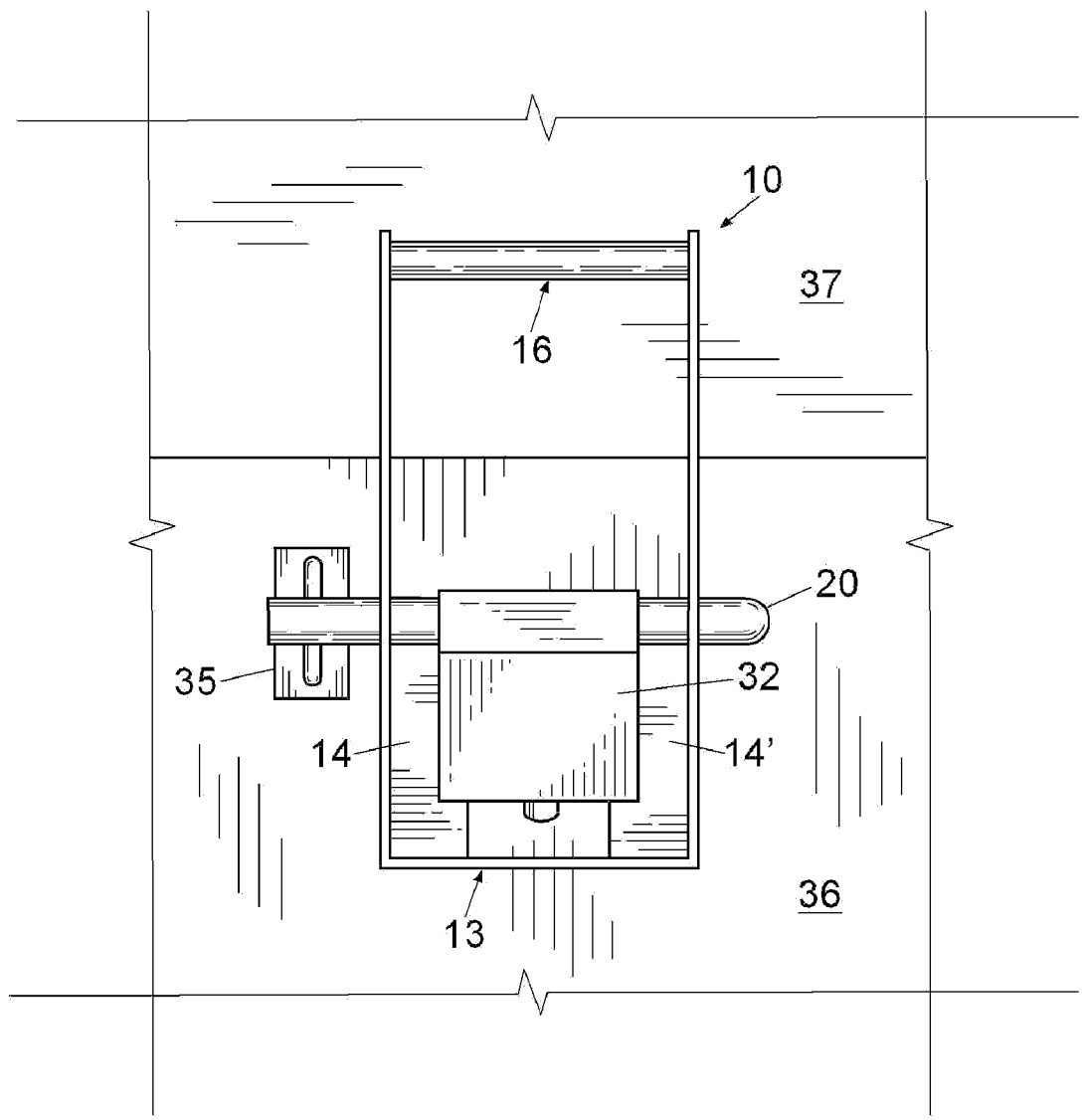
FIG. 3 features an enlarged top plan view of the anti-theft device installed in the cart as seen in FIG. 1.
Figure 4:
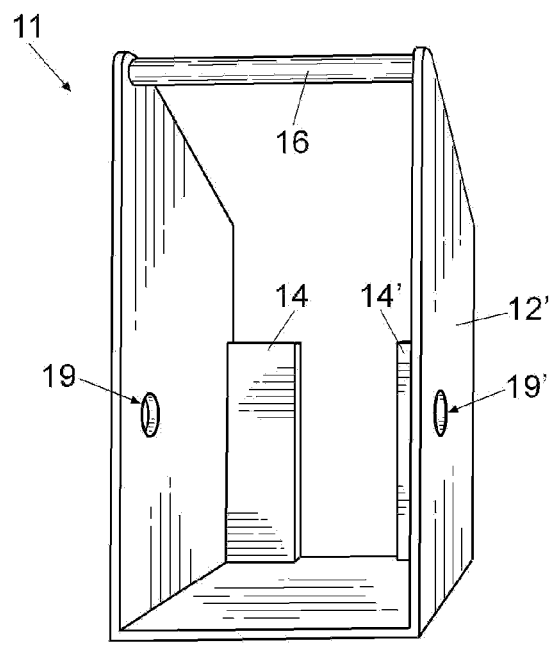
FIG. 4 pictures a top, rear, left side perspective view of the anti-theft device housing as removed from the golf cart.
Figure 6:
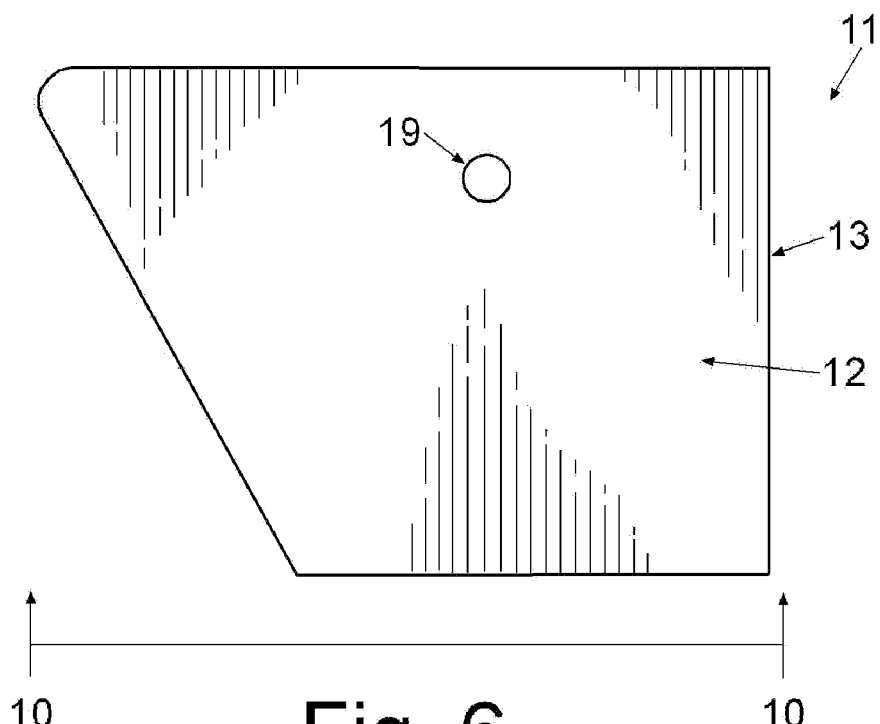
FIG. 6 shows a right side elevational view of the anti-theft device housing as seen in FIG. 4.
Figure 7:
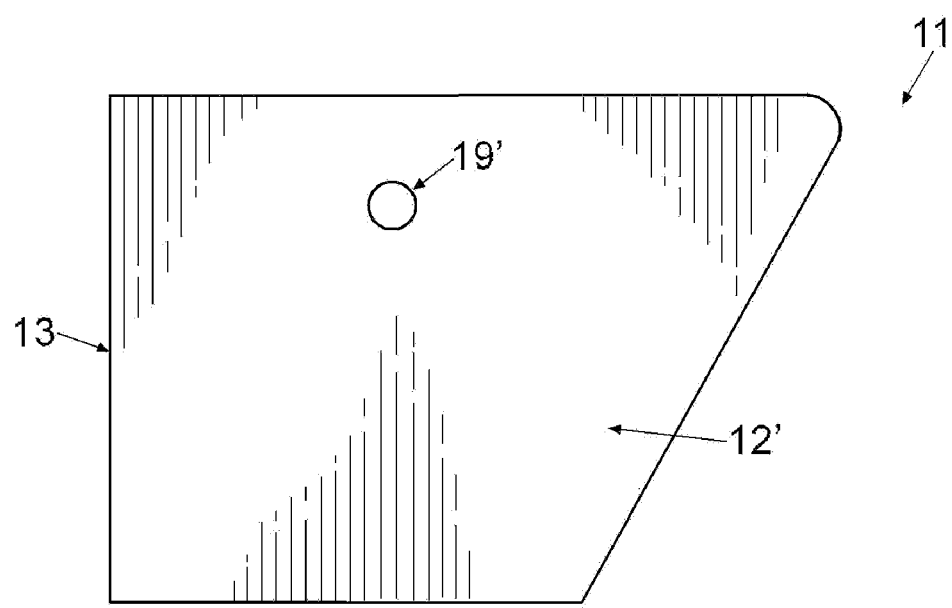
FIG. 7 provides a left side elevational view of the anti-theft device housing as seen in FIG. 4.
Figure 8:
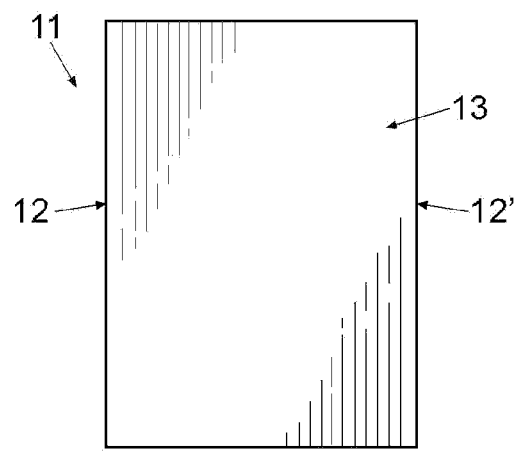
FIG. 8 demonstrates a rear elevational view of the anti-theft device housing as seen in FIG. 4.
Figure 9:
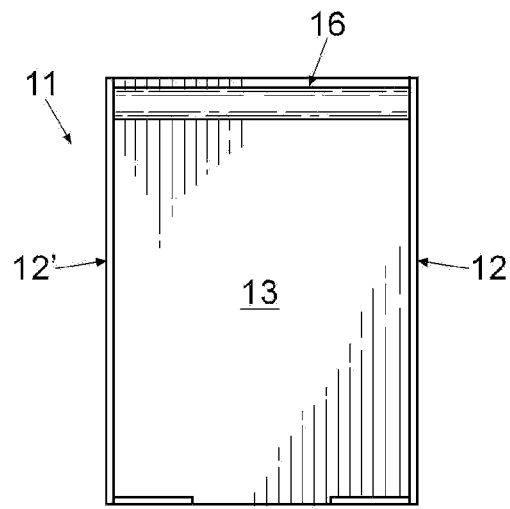
FIG. 9 depicts a front elevational view of the anti-theft device housing as seen in FIG. 5 along lines 9-9.
Figure 10:
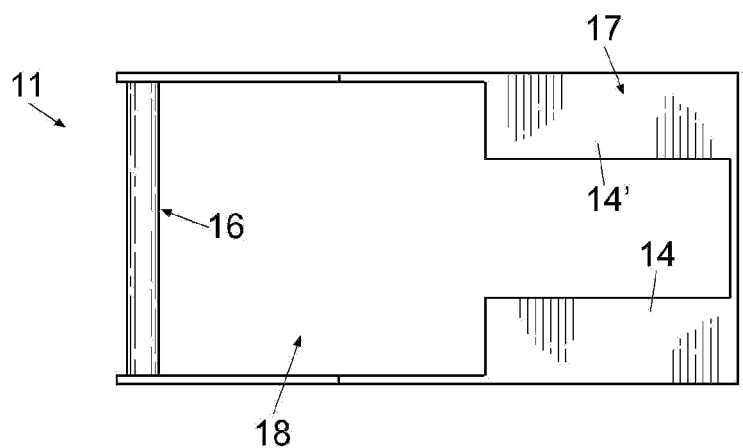
FIG. 10 pictures a bottom plan view of the anti-theft device housing as seen along lines 10-10 in FIG. 6.

For a better understanding of the invention and its operation, turning now to the drawings, in FIG. 1 vehicle anti-theft device 10 is shown positioned on cart floor 36 against cart front wall 37 over accelerator pedal 32 (FIG. 3) of golf cart 30. Golf cart 30 is a typical, conventional battery powered golf cart although other vehicles could equally employ anti-theft device 10 such as gasoline lawn mowers, tractors, cars, trucks and the like. An enlarged side view of anti-theft device 10 is shown in FIG. 2 with L-shaped steel retaining rod 20 firmly against the rear of accelerator pedal 32 which is shown in dashed lines positioned approximately ⅜ inch (0.952 cm) from cart floor 36. As seen in a top view in FIG. 3, retaining rod 20 passes through apertures 19', 19 (FIGS. 4, 6 and 7) and behind pedal 32 to wedge pedal 32 in an immobile position such as seen in FIG. 2. Padlock 35, a cable wire, lock or other suitable means for securement as shown in FIGS. 2, 3 and 5 passes through aperture 21 of retaining rod 20 to secure retaining rod 20 in place to prevent movement of accelerator pedal 32, while also helping to prevent removal of anti-theft device 10 from cart 30.

Anti-theft device 10 includes housing 11 preferably formed from ⅛ inch (0.3175 cm) steel plate although other suitable, rigid materials such as aluminum could also be used. Housing 11 is formed such as by welding for stability and structural integrity. As seen in FIGS. 4-10, housing 11 includes right side 12 (FIG. 6) with aperture 19 and opposing left side 12' (FIG. 7) with aperture 19'. Rear 13 (FIG. 8) is solid and rectangular while front brace 16 (FIGS. 9 and 10) consists of a solid, steel cylindrical member. Rear 13 and front brace 16 are each joined to sides 12, 12' such as by welding or the like. Bottom 17 (FIGS. 5 and 10) consists of sections 14, 14' which define T-shaped opening 18 to allow anti-theft device 10 to be placed over vehicle accelerator pedal 32 as shown in FIG. 3. Sections 14, 14' of bottom 17 are sized and spaced apart less than the width of pedal 32 (see FIG. 3) thus keeping anti-theft device 10 from being lifted from cart 30 while locked in place. The wider portion of T-shaped opening 18 allows for easy insertion and removal of accelerator pedal 32 while the narrower portion between sections 14, 14' prevents removal of housing 11 from pedal 32. Housing 11 can be molded or otherwise formed such as by welding sides 12, 12', rear 13, front brace 16 and bottom 17 using standard techniques. While steel is the preferred material, aluminum, plastics or other suitable materials could also be used. The exact shape of housing 11 can be varied to accommodate the shapes of particular golf cart floors and front wall angles.

The method of use of anti-theft device 10 includes the steps of positioning housing 11 over the accelerator pedal such as accelerator pedal 32 of golf cart 30 using T-shaped opening 18 in bottom 17 whereby housing 11 will then rest on floor 36. Next, housing 11 is moved toward and positioned against cart front wall 37 allowing the shaft of accelerator pedal 32 to slide between sections 14, 14'. Retaining rod 20 is then positioned in either one of side apertures 19, 19', slid behind accelerator pedal 32 and then through the other of side apertures 19, 19' to retain pedal 32 between rear 13 and retaining rod 20. As seen in FIGS. 1, 2, 3 and 5 retaining rod is initially positioned through aperture 19' but as understood could initially pass through either side aperture 19, 19' and maintain the same security when locked. Once retaining rod 20 has passed through both side apertures 19, 19' and behind accelerator pedal 32, padlock 35 is then opened and the hook portion is placed through retaining rod aperture 21 (FIG. 5). Next, padlock 35 is closed whereby anti-theft device 10 is now secure within golf cart 30 preventing depression of pedal 32. As seen in FIG. 3 the width of space between sections 14, 14' is narrower than the width of accelerator pedal 32 thus preventing pedal 32 from sliding between sections 14, 14' in an attempt to remove housing 11 from cart 30. As further seen in FIGS. 1 and 2, when anti-theft device 10 is locked in place, housing 11 cannot be pivoted side to side due to the shape of opposing sides 12, 12' and bottom 17 thus providing further security. Should an unauthorized person try to drive or move golf cart 30, accelerator pedal 32 can not be depressed, housing 11 or retaining rod 20 cannot be removed and therefore golf cart 30 is safely immobilized.

Figure 5:
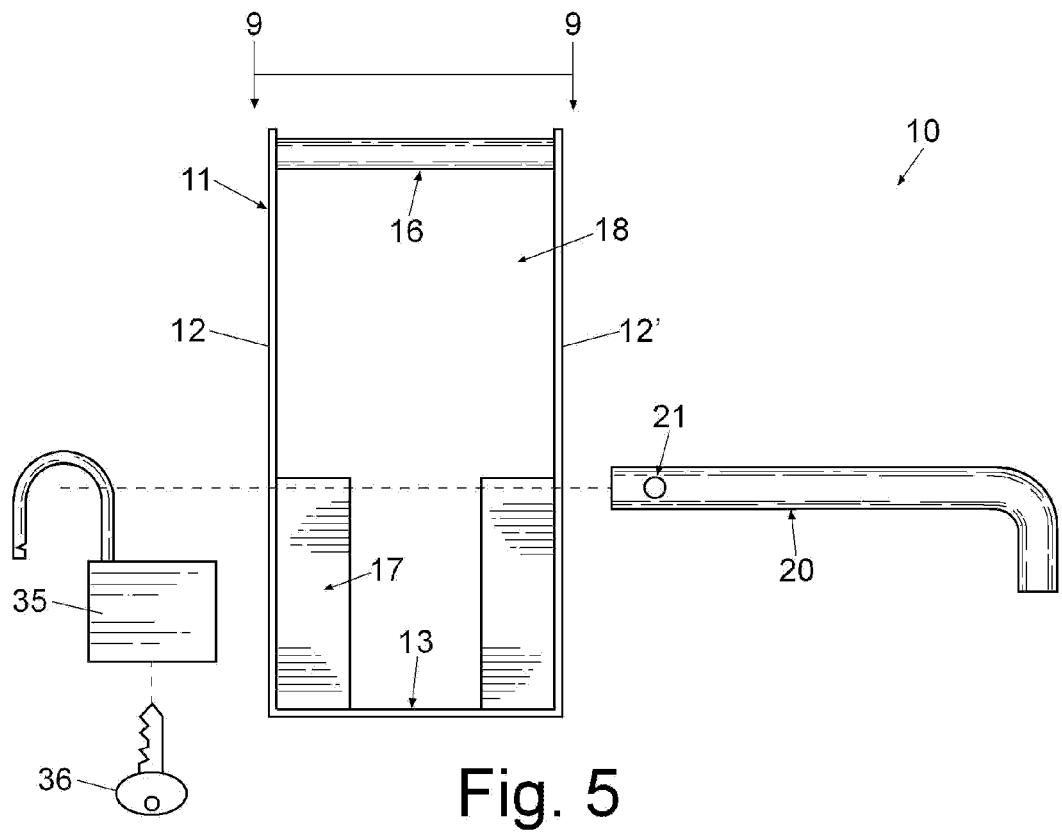
FIG. 5 depicts a top plan view of the anti-theft device housing as seen in FIG. 4 prior to retaining rod insertion.

Should authorized persons desire to drive golf cart 30, key 36 as seen in FIG. 5 is inserted and padlock 35 unlocked and removed from retaining rod aperture 21. Next, retaining rod 20 is slid from side apertures 19, 19' allowing housing 11 to be moved along floor 36 to allow accelerator pedal 32 to clear T-shaped opening 18. Housing 11 is then lifted from accelerator pedal 32 whereby golf cart 30 is then driveable as conventional.

The illustrations and examples provided herein are for explanatory purposes and are not intended to limit the scope of the appended claims.

I claim:

1. An anti-theft device for a vehicle having a pivotal pedal comprising: a housing, said housing comprising a rear wall, a pair of opposing side walls, a bottom wall, said bottom wall comprising a pair of sections, said pair of sections spaced apart to form a T-shaped opening within said housing bottom wall, said rear, bottom and pair of opposing side walls joined to enclose a vehicle pedal, a front brace, said front brace attached to said pair of opposing side walls and opposing said rear wall, said pair of opposing side walls each defining an aperture, a rod, said rod for positioning in said apertures behind the pedal and contiguous thereto, whereby said housing can be placed over the vehicle pedal to allow said rod to prevent the vehicle pedal from pivoting.

2. The anti-theft device of claim 1 wherein said rod is formed from steel.

3. The anti-theft device of claim 1 wherein said housing is formed from a steel plate.

4. The anti-theft device of claim 1 wherein said opposing side walls are spaced apart a distance greater than the width of the pivotal pedal.

5. The anti-theft device of claim 1 wherein said rod is L-shaped.

6. The anti-theft device of claim 1 wherein said rod defines a locking channel and a means to lock said rod in said housing, said locking means comprising a pad lock, said locking means positioned in said locking channel.

7. The anti-theft device of claim 1 wherein said bottom wall defines a pedal opening.

8. An anti-theft device for a vehicle having a floor angularly joined to a front wall with a proximate pivotal pedal comprising: a housing, said housing comprising a rear wall, a pair of opposing side walls, said pair of opposing side walls contoured to replicate the vehicle floor and front wall junction, a bottom wall, said bottom wall comprising a pair of sections, said pair of sections spaced apart to form a T-shaped opening within said housing bottom wall, said rear, bottom and pair of opposing side walls joined to enclose a vehicle pedal, said opposing side walls spaced apart a distance greater than the width of said pedal, a front brace, said front brace attached to said pair of opposing side walls and opposing said rear wall, said pair of opposing side walls each defining an aperture, a rod, said rod for positioning in said apertures behind the pedal and contiguous thereto, whereby said housing can be placed over the vehicle pedal against the vehicle floor' and front wall to allow said rod to prevent the vehicle pedal from pivoting.

9. The anti-theft device of claim 8 wherein said brace comprises a cylindrical member.

* * * * *